(12) United States Patent
Yan et al.

(10) Patent No.: US 11,804,764 B2
(45) Date of Patent: Oct. 31, 2023

(54) VIBRATION EXCITER

(71) Applicant: AAC Technologies Pte. Ltd., Singapore (SG)

(72) Inventors: Xudong Yan, Shenzhen (CN); Wei Liu, Shenzhen (CN); Keyong Zhou, Shenzhen (CN); Wenya Han, Shenzhen (CN); Yong You, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 563 days.

(21) Appl. No.: 16/994,692

(22) Filed: Aug. 17, 2020

(65) Prior Publication Data

US 2020/0412220 A1    Dec. 31, 2020

Related U.S. Application Data

(63) Continuation of application No. PCT/CN2019/094043, filed on Jun. 30, 2019.

(51) Int. Cl.
*H02K 33/02* (2006.01)
*H02K 35/02* (2006.01)
*B06B 1/04* (2006.01)

(52) U.S. Cl.
CPC .......... *H02K 33/02* (2013.01); *H02K 35/02* (2013.01); *B06B 1/045* (2013.01)

(58) Field of Classification Search
CPC ........ H02K 33/18; H02K 33/16; H02K 33/02; H02K 35/04; H02K 35/00; H02K 35/02; B06B 1/045

USPC ............................................... 310/21, 29, 32
See application file for complete search history.

(56) References Cited

U.S. PATENT DOCUMENTS

| 6,208,237 B1* | 3/2001 | Saiki | H04R 11/02 381/396 |
| 6,847,139 B2* | 1/2005 | Ueda | H04R 9/06 381/396 |
| 7,006,641 B1* | 2/2006 | Saiki | B06B 1/0215 381/98 |
| 2010/0127581 A1* | 5/2010 | Yun | B06B 1/045 310/25 |
| 2017/0033651 A1* | 2/2017 | Mao | H02K 33/16 |

* cited by examiner

*Primary Examiner* — Tulsidas C Patel
*Assistant Examiner* — Robert E Mates
(74) *Attorney, Agent, or Firm* — W&G Law Group (57) ABSTRACT

Provided is a vibration exciter, comprising a shell having a receiving space, a vibration unit suspended in the shell, a coil configured to drive the vibration unit, and an elastic member configured to suspend the vibration unit in the shell. The vibration unit comprises a mass block fixedly connected to the elastic member. The mass block comprises fixing planes opposite to each other along a vibration direction. The elastic member has one end fixed to the mass block and another end fixed to the shell, and a projection of the elastic member in the vibration direction is at least partially located in the fixing planes. Compared with the related art, the vibration exciter provided by the present invention can improve the vibration stability.

8 Claims, 6 Drawing Sheets

VIBRATION EXCITER

TECHNICAL FIELD

The present invention relates to the field of exciter technologies and, particularly, relates to a vibration exciter.

BACKGROUND

With the advent of the Internet era, more electronic devices are gradually occupying everyone's life, including portable mobile phones. The mobile phones have more diverse functions. The high-quality sound function of a mobile phones is one of the important features to be considered by people who plan to buy a mobile phone. At present, with the advance in touch screen mobile phones, screen sounders are also widely used in smart phones. With respect to a screen-sounding smart phone, high-quality sound can be heard when ear is close to any part of the screen, which is convenient for answering and realizes a clear calling effect. As a sound-generating device, the exciter is a key component of the screen to sound. The exciter having high-performance is particularly important for a rapid application of the screen-sounding technology.

However, in the related art, the screen sounding and screen vibration require separate devices, which occupy the volume of the whole apparatus, and the vibration balance of the exciter that realizes screen sounding in the related art is poor.

Therefore, it is necessary to provide an improved vibration exciter to solve the above problems.

SUMMARY

In view of the technical problem in the related art that an exciter has poor balance performance. the present invention provides a vibration exciter which can ensure vibration balance.

A vibration exciter comprises a shell having a receiving space; a vibration unit suspended in the shell; a coil configured to drive the vibration unit; and an elastic member configured to suspend the vibration unit in the shell. The vibration unit comprises a mass block fixedly connected to the elastic member, the mass block comprises fixing planes opposite to each other along a vibration direction, the elastic member has one end fixed to the mass block and another end fixed to the shell, and a projection of the elastic member in the vibration direction is at least partially located in the fixing planes.

As an improvement, four elastic members are provided, and each of the fixing planes is fixed to two of the four elastic members.

As an improvement, each of the four elastic member comprises a first fixing portion fixedly connected to one of the fixing planes, a second fixing portion fixedly connected to the shell, and a deformation portion connecting the first fixing portion with the second portion; each of the fixing planes is rectangular and comprises first edge portions parallel to and opposite to each other, and second edge portions parallel to and opposite to each other, the second edge portions being respectively connected to the first edge portions; the first fixing portion is fixed to a corresponding one first edge portion of the first edge portions; the deformation portion comprises a first deformation portion extending from the first fixing portion along one of the first edge portions, a second deformation portion extending from one end of the first deformation portion facing away from the first fixing portion along one of the second edge portions, and a third deformation portion extending from one end of the second deformation portion facing away from the first fixing portion along another one of the first edge portions, the third deformation portion being connected to the second fixing portion.

As an improvement, each of the four elastic members further comprises an opening defined by the first deformation portion, the second deformation portion and the third deformation portion; for two of the four elastic members on a same one of the fixing planes, the openings are opposite to each other, the second deformation portions are opposite to each other and are respectively arranged along the second edge portions, and the first fixing portions are respectively fixed to different ones of the first edge portions.

As an improvement, for two elastic members of the four elastic members on a same one of the fixing planes, a projection of the first fixing portion of one of the two elastic members along the vibration direction and a projection of the second fixing portion of the other one of the two elastic members along the vibration direction are located in a same one of the first edge portions, and are spaced from each other.

As an improvement, the mass block comprises an avoiding portion formed by recessing from the fixing planes in a direction facing away from the deformation portion and corresponding to the deformation portion; the avoiding portion comprises a first recess portion corresponding to the first deformation portion, a second recess portion corresponding to the second deformation portion and a third recess portion corresponding to the third deformation portion; and a recessing depth of the first recess portion along the vibration direction is smaller than a recessing depth of the third recess portion along the vibration direction.

As an improvement, the shell comprises a cylindrical casing having the receiving space, and cover plates capping two ends of the casing; each of the cover plates is opposite to and spaced apart from one of the fixing planes; and the second fixing portion is fixedly connected to one of the cover plates.

As an improvement, the vibration exciter further comprises a gasket. The gasket is arranged between the one of the cover plates and the second fixing portion and is configured to fix the second fixing portion to the one of the cover plate.

As an improvement, the vibration exciter further comprises a flexible circuit board fixed to the other one of the cover plates, and the coil is electrically connected to the flexible circuit board and is fixed to the other one of cover plates through the flexible circuit board.

As an improvement, the vibration exciter further comprises a magnetizer pillar fixed to the cover plates, wherein the coil is coupled to the magnetizer pillar; the mass block comprises a through-hole extending along the vibration direction, and inner walls surrounding the through-hole; the vibration unit further comprises a magnetic body received in the through-hole; the inner walls comprise first inner walls opposite to each other, and second inner walls opposite to each other and respectively connected to the first inner walls; the magnetic body comprises four magnets spaced apart from the coil; the four magnets are fixed to the first inner walls and the second inner walls in one-to-one correspondence.

As an improvement, each of the four magnets is magnetized along the vibration direction.

As an improvement, the vibration exciter further comprises a magnetizer plate fixed on a side of the coil facing away from the flexible circuit board and surrounding the magnetizer pillar.

Compared with the related art, in the vibration exciter provided by the present invention, the elastic member has one end fixed to the mass block and another end fixed to the shell, and the projection of the elastic member along the vibration direction is at least partially located in the fixing plane of the mass block, thereby achieving the vibration balance. In this way, the vibration balance of the vibration exciter is guaranteed and the vibration stability of the vibration exciter is improved.

BRIEF DESCRIPTION OF DRAWINGS

In order to explain technical solutions in embodiments of the present invention, drawings used in the embodiments are described as below. The drawings described below are merely some embodiments of the present invention, those skilled in the art can also obtain other drawings according to these drawings without creative efforts.

DESCRIPTION OF EMBODIMENTS

In order to describe the technical solutions in the embodiments of the present invention clearly and in detail, the present invention is illustrated in the accompanying drawings. The described embodiments are merely some embodiments, rather than all embodiments, of the present invention. Based on the embodiments of the present invention, other embodiments obtained by those skilled in the art without creative efforts shall fall within the protection scope of the present invention.

Referring to FIG. 1 to FIG. 6, the present invention provides a vibration exciter 100, which includes a shell 10 having a receiving space, a vibration unit 20 suspended in the receiving space, a coil 30 configured to drive the vibration unit 20, a flexible circuit board 40 electrically connected to the coil 30, a magnetizer pillar 50 fixed to the shell 10, a magnetizer plate 60 surrounding the magnetizer pillar 50, an elastic member 70 configured to suspend the vibration unit 20 in the shell 10, and a gasket 80 for fixing the elastic member 70.

Figure 1:
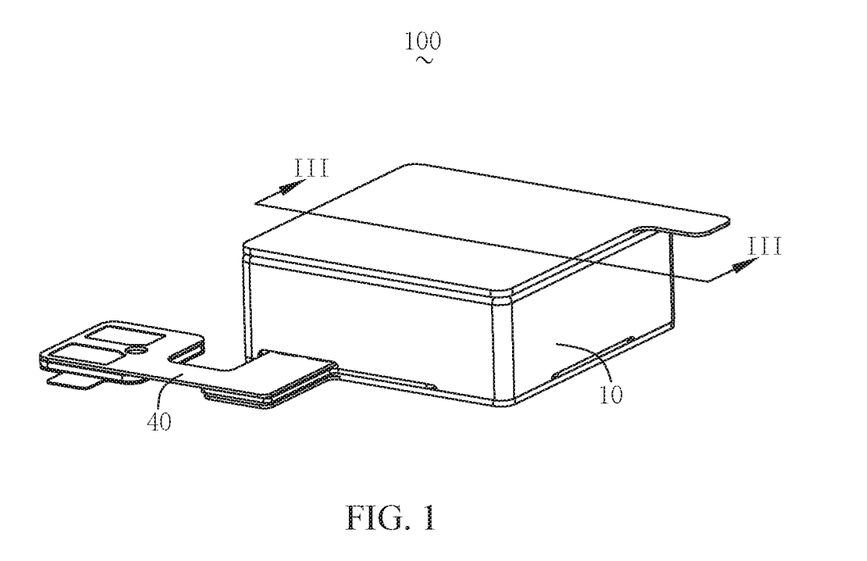
FIG. 1 is a schematic perspective view of a vibration exciter of the present invention.
Figure 2:
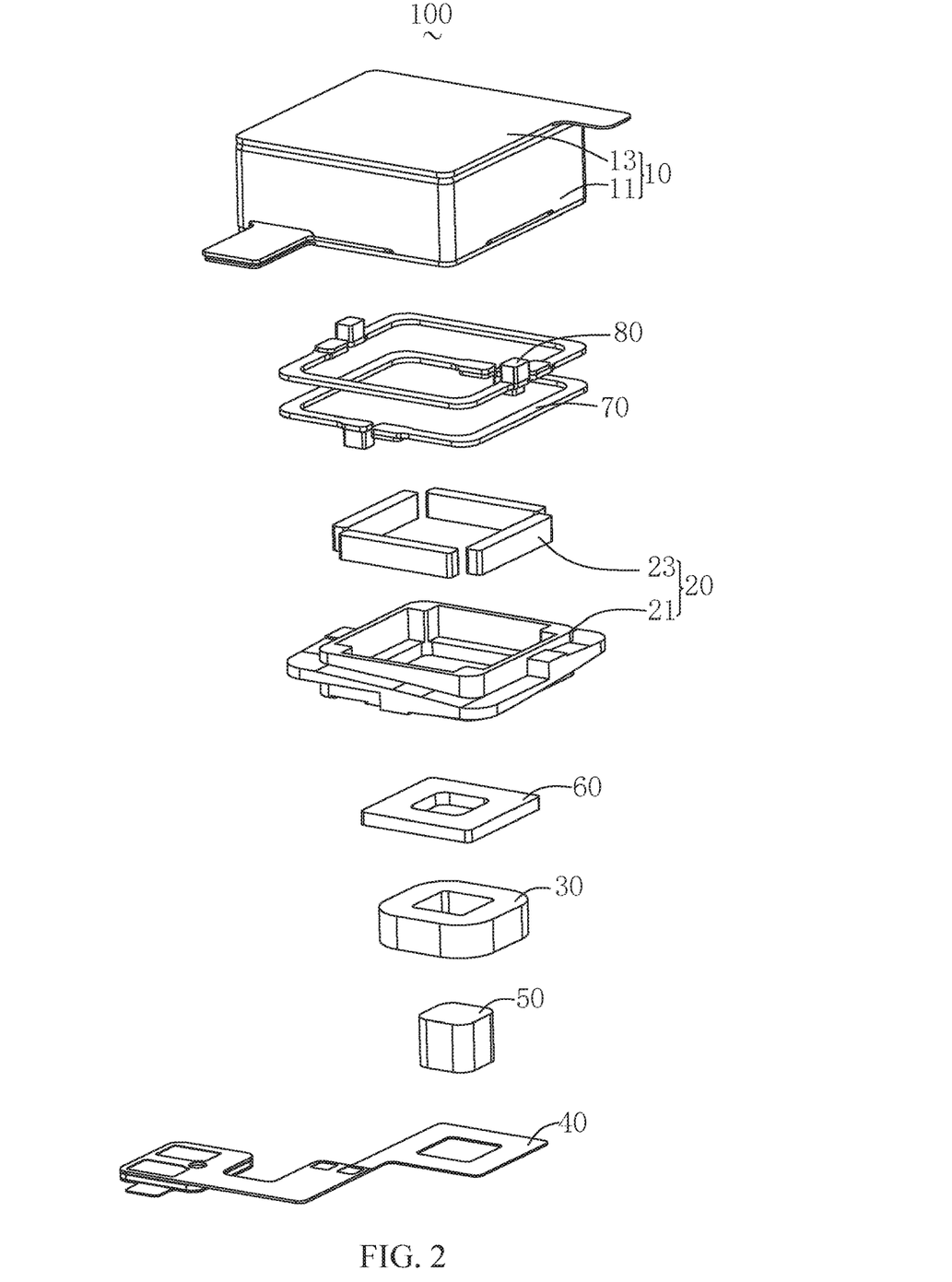
FIG. 2 is an exploded view of the vibration exciter shown in FIG. 1.
Figure 3:
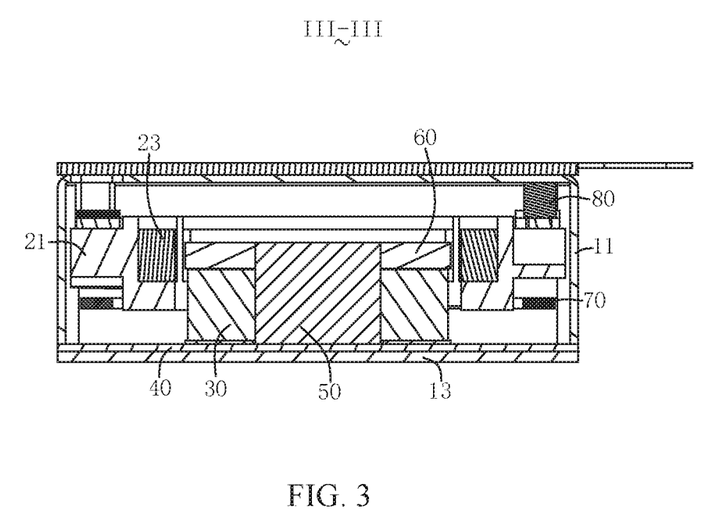
FIG. 3 is a cross-sectional view cut along shown in FIG. 1.

The shell 10 includes a cylindrical casing 11 having the receiving space, and a cover plate 13 capping two ends of the casing 11.

The vibration unit 20 includes a mass block 21 fixedly connected to the elastic member 70 and a magnet body 23 received in the mass block 21. The magnet body 23 is spaced apart from the coil 30.

Figure 4:
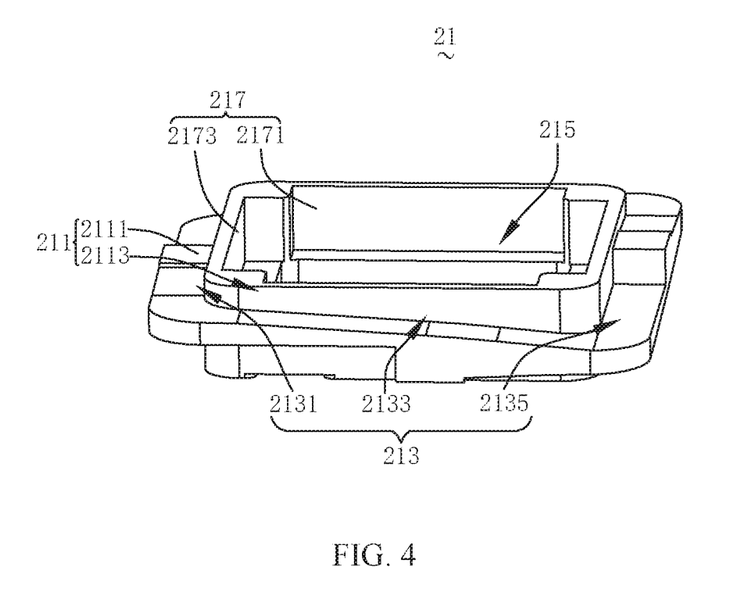
FIG. 4 is a schematic perspective view of a mass block.

The mass block 21 includes two fixing planes 211 opposite to each other along a vibration direction, avoiding portions 213 recessed from the fixing planes 211, a through-hole 215 extending along the vibration direction, and inner walls 217 surrounding the through-hole 215. The magnet body 23 is received in the through-hole 215. The cover plate 13 is opposite to and spaced apart from the fixing planes 211.

The fixing plane 211 is rectangular, and includes two first edge portions 2111 parallel to and opposite to each other, and two second edge portions 2113 parallel to and opposite to each other. The two second edge portions 2113 are respectively connected to the first edge portions 2111. Projections of the two fixing planes 211 along the vibration direction are completely overlapped with each other, and the first edge portion 2111 of one fixing plane 211 is completely overlapped with the second edge portion 2113 of the other fixing plane 211. In other words, the first edge portion 2111 of one fixing plane 211 corresponds to the second edge portion 2113 of the other fixing plane 211, and a second edge portion 2113 of the one fixing plane 211 corresponds to a first edge portion 2111 of the other fixing plane 211.

The inner walls 217 include two opposite first inner walls 2171, and two opposite second inner walls 2173 connected to the two first inner walls 2171 respectively. The magnet body 23 includes four magnets spaced apart from the coil 30. The magnets are magnetized in the vibration direction. One magnet is fixed to each of the first inner walls 2171 and each of the second inner walls 2173.

The flexible circuit board 40 is fixed to the cover plate 13. The coil 30 is electrically connected to the flexible circuit board 40 and is fixed to the cover plate 13 through the flexible circuit board 40.

The magnetizer pillar 50 is fixed to the cover plate 13. The coil 30 is coupled to the magnetizer pillar 50. The magnetizer plate 60 is fixed at a side of the coil 30 facing away from the flexible circuit board 40 and surrounding the magnetizer pillar 50.

Figure 6:
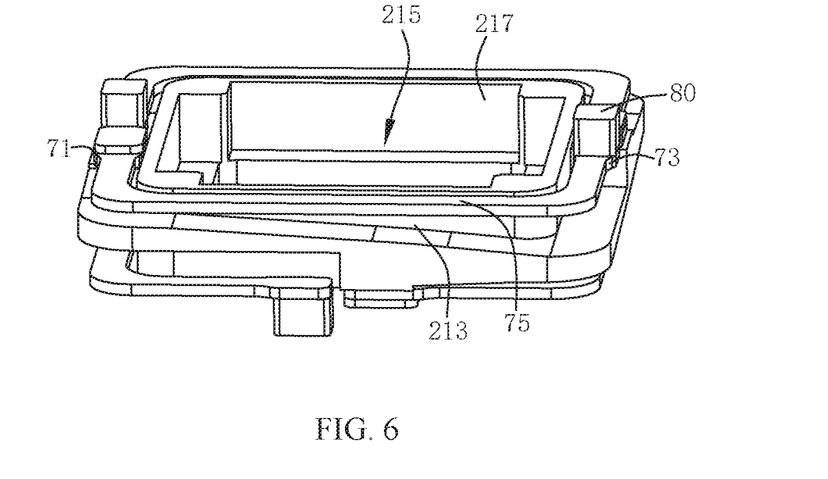
FIG. 6 is a schematic view of a connection structure of an elastic member and a mass block.

One end of the elastic member 70 is fixed to the mass block 21, the other end thereof is fixed to the shell 10, and a projection of the elastic member 70 in the vibration direction is at least partially located in the fixing plane 211.

Figure 5:
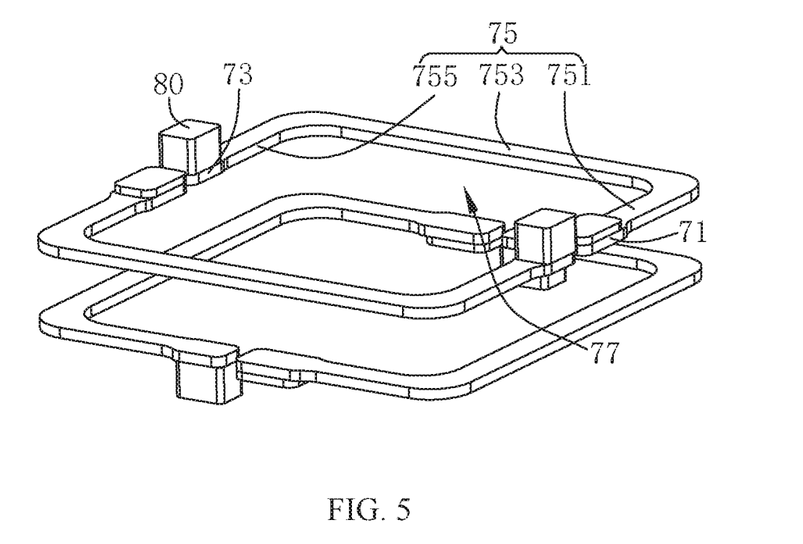
FIG. 5 is a schematic perspective view of an elastic member.

In an embodiment, four elastic members 70 are provided, and two of the four elastic members 70 are fixed to one corresponding fixing plane 211. The elastic member 70 includes a first fixing portion 71 fixedly connected to the fixing plane 211, a second fixing portion 73 fixedly connected to the shell 10, a deformation portion 75 connecting the first fixing portion 71 with the second fixing portion 73, and an opening 77 formed by the deformation portion 75. The first fixing portion 71 is fixed to the first edge portion 2111. In the same fixing plane 211, a projection of the first fixing portion 71 of one elastic member 70 along the vibration direction and a projection of the second fixing portion 73 of the other elastic member 70 along the vibration direction are located in the same first edge portion 2111, and are spaced apart from each other.

The deformation portion 75 includes a first deformation portion 751 extending from the first fixing portion 71 along one of the first edge portions 2111, a second deformation portion 753 extending from one end of the first deformation portion 751 facing away from the first fixing portion 71 along one of the second edge portions 2113, and a third deformation portion 755 extending from one end of the second deformation portion 753 facing away from the first fixing portion 751 along the other one of the first edge portions 751 in the same fixing plane 211. The third deformation portion 755 is connected to the second fixing portion 73.

The opening 77 is defined by the first deformation portion 751, the second deformation portion 753 and the third deformation portion 755. The openings 77 of two elastic members 70 on the same fixing plane 211 are opposite to each other. The second deformation portions 753 of the two elastic members 70 on the same fixing plane 211 are opposite to each other and are arranged along different second edge portions 2113. The first fixing portions 71 of the two elastic members 70 on the same fixing plane 211 are fixed to different first edge portions 2111.

The avoiding portion 213 is recessed from the fixing plane 211 in a direction facing away from the deformation portions 75, and the avoiding portion 213 corresponds to the deformation portion 75. For example, four avoiding portions 213 are provided and arranged in correspondence with deformation portions 75 of the four elastic members 70. The avoiding portion 213 includes a first recess portion 2131 corresponding to the first deformation portion 751, a second recess portion 2133 corresponding to the second deformation portion 753 and a third recess portion 2135 corresponding to the third deformation portion 755. A recessing depth of the first recess portion 2131 along the vibration direction is smaller than that of the third recess portion 2135 along the vibration direction.

The gasket 80 is arranged between the cover plate 13 and the elastic member 70 and configured to fix the elastic member 70 to the cover plate 13. For example, the gasket 80 is arranged between the cover plate 13 and the second fixing portion 73, and fix the second fixing portion 73 to the cover plate 13. Four gaskets 80 are provided to correspond to the elastic members 70.

It can be understood that the first edge portion 2111 and the second edge portion 2113 of one fixing plane 211 correspond to the second edge portion 2113 and the first edge portion 2111 of another fixing plane 211, such that the projections of the first fixing portions 71 of the four elastic members 70 are located on four sides of a rectangle, respectively. In other words, the four elastic members 70 support different positions of the mass block 21 to keep the vibration balance of the mass block 21.

The vibration exciter 100 provided by the present invention can effectively ensure the vibration balance. Under the same stroke, the maximum stress of the elastic member 70 is smaller than that of a single planar spring, which considerably increases difference between the second-order mode and the first-order mode. At the same time, screen sounding and tactile feedback functions can be realized, and the occupied space in the whole apparatus is reduced.

Compared with the related art, in the vibration exciter provided by the present invention, the elastic member has one end fixed to the mass block and another end fixed to the shell, and the projection of the elastic member along the vibration direction is at least partially located in the fixing plane of the mass block, thereby achieving the vibration balance. In this way, the vibration balance of the vibration exciter is guaranteed and the vibration stability of the vibration exciter is improved.

The above are merely the preferred embodiments of the present invention, but are not intended to limit the present invention. Any modifications, equivalent replacements and improvements made within the spirits and principles of the present invention shall fall within the protection scope of the present invention.

What is claimed is:
1. A vibration exciter, comprising:
a shell having a receiving space;
a vibration unit suspended in the shell;
a coil configured to drive the vibration unit; and
an elastic member configured to suspend the vibration unit in the shell, wherein the vibration unit comprises a mass block fixedly connected to the elastic member, the mass block comprises fixing planes opposite to each other along a vibration direction, the elastic member has one end fixed to the mass block and another end fixed to the shell, and a projection of the elastic member in the vibration direction is at least partially located in the fixing planes;

wherein four elastic members are provided, and each of the fixing planes is fixed to two of the four elastic members;

wherein each of the four elastic methods comprises a first fixing portion fixedly connected to one of the fixing planes, a second fixing portion fixedly connected to the shell, and a deformation portion connecting the first fixing portion with the second fixing portion;

each of the fixing planes is rectangular and comprises first edge portions parallel to and opposite to each other, and second edge portions parallel to and opposite to each other, the second edge portions being respectively connected to the first edge portions;

the first fixing portion is fixed to a corresponding one first edge portion of the first edge portions;

the deformation portion comprises a first deformation portion extending from the first fixing portion along one of the first edge portions, a second deformation portion extending from one end of the first deformation portion facing away from the first fixing portion along one of the second edge portions, and a third deformation portion extending from one end of the second deformation portion facing away from the first fixing portion along another one of the first edge portions, the third deformation portion being connected to the second fixing portion;

wherein each of the four elastic members further comprises an opening defined by the first deformation portion, the second deformation portion and the third deformation portion;

for two of the four elastic members on a same one of the fixing planes, the openings are opposite to each other, the second deformation portions are opposite to each other and are respectively arranged along the second edge portions, and the first fixing portions are respectively fixed to different ones of the first edge portions;

wherein, for two elastic members of the four elastic members on a same one of the fixing planes, a projection of the first fixing portion of one of the two elastic members along the vibration direction and a projection of the second fixing portion of the other one of the two elastic members along the vibration direction are located in a same one of the first edge portions, and are spaced from each other.

2. The vibration exciter as described in claim 1, wherein the mass block comprises an avoiding portion formed by recessing from the fixing planes in a direction facing away from the deformation portion and corresponding to the deformation portion; the avoiding portion comprises a first recess portion corresponding to the first deformation portion, a second recess portion corresponding to the second deformation portion and a third recess portion corresponding to the third deformation portion; and a recessing depth of the first recess portion along the vibration direction is smaller than a recessing depth of the third recess portion along the vibration direction.

3. The vibration exciter as described in claim 1, wherein the shell comprises a cylindrical casing having the receiving space, and cover plates capping two ends of the casing; each of the cover plates is opposite to and spaced apart from one of the fixing planes; and the second fixing portion is fixedly connected to one of the cover plates.

4. The vibration exciter as described in claim 3, further comprising a gasket, wherein the gasket is arranged between the one of the cover plates and the second fixing portion and is configured to fix the second fixing portion to the one of the cover plates.

5. The vibration exciter as described in claim 3, further comprising a flexible circuit board fixed to the other one of the cover plates, wherein the coil is electrically connected to the flexible circuit board and is fixed to the other one of the cover plates through the flexible circuit board.

6. The vibration exciter as described in claim 5, further comprising a magnetizer pillar fixed to the cover plates, wherein the coil is coupled to the magnetizer pillar; the mass block comprises a through-hole extending along the vibration direction, and inner walls surrounding the through-hole; the vibration unit further comprises a magnetic body received in the through-hole; the inner walls comprise first inner walls opposite to each other, and second inner walls opposite to each other and respectively connected to the first inner walls; the magnetic body comprises four magnets spaced apart from the coil; the four magnets are fixed to the first inner walls and the second inner walls in one-to-one correspondence.

7. The vibration exciter as described in claim 6, wherein each of the four magnets is magnetized along the vibration direction.

8. The vibration exciter as described in claim 6, further comprising a magnetizer plate fixed on a side of the coil facing away from the flexible circuit board and surrounding the magnetizer pillar.

* * * * *